United States Patent [19]

Crumb

[11] 4,407,121
[45] Oct. 4, 1983

[54] MASTER CYLINDER

[75] Inventor: Donald A. Crumb, Mishawaka, Ind.

[73] Assignee: The Bendix Corporation, Southfield, Mich.

[21] Appl. No.: 258,827

[22] Filed: Apr. 29, 1981

[51] Int. Cl.³ .............................................. B60T 11/20
[52] U.S. Cl. ....................................... 60/562; 60/589; 251/303; 251/337
[58] Field of Search ......................... 60/562, 585, 589; 251/303, 337

[56] References Cited

U.S. PATENT DOCUMENTS

| | | | |
|---|---|---|---|
| 3,232,059 | 2/1966 | Thesier | 60/589 |
| 3,357,183 | 12/1967 | Krieger | 60/589 |
| 3,537,325 | 11/1970 | Orent | 251/337 |
| 3,557,555 | 1/1971 | Wilson | 60/562 |
| 3,818,706 | 6/1974 | Gaiser | 60/589 |
| 4,152,897 | 5/1979 | Falk | 60/589 |

FOREIGN PATENT DOCUMENTS 2250392 4/1974 Fed. Rep. of Germany ........ 60/585

Primary Examiner—Abraham Hershkovitz
Attorney, Agent, or Firm—Paul David Schoenle; Ken C. Decker

[57] ABSTRACT

A dual master cylinder (10) includes a pair of pistons (62, 106) moving in a bore (14) to contract a pair of pressure chambers (64, 108). A housing 12 defines a pair of inlets (26, 28) communicating liquid from a reservoir (18) into the pair of pressure chambers (64, 108). A pair of outlets (46, 48) communicate liquid from the pair of pressure chambers (64, 108) to a pair of brake systems (50, 52). A pair of tilt valves (34, 36) control liquid communication through the inlets (26, 28). The pair of pistons (62, 106) carry a pair of valve actuators (182, 210) which open and close the pair of tilt valves (34, 36) in response to movement of the pair of pistons (62, 106) within the housing (12). The pair of actuators (182, 210) cooperate with one another to simultaneously close the pair of tilt valves (34, 36) during a brake application.

13 Claims, 2 Drawing Figures

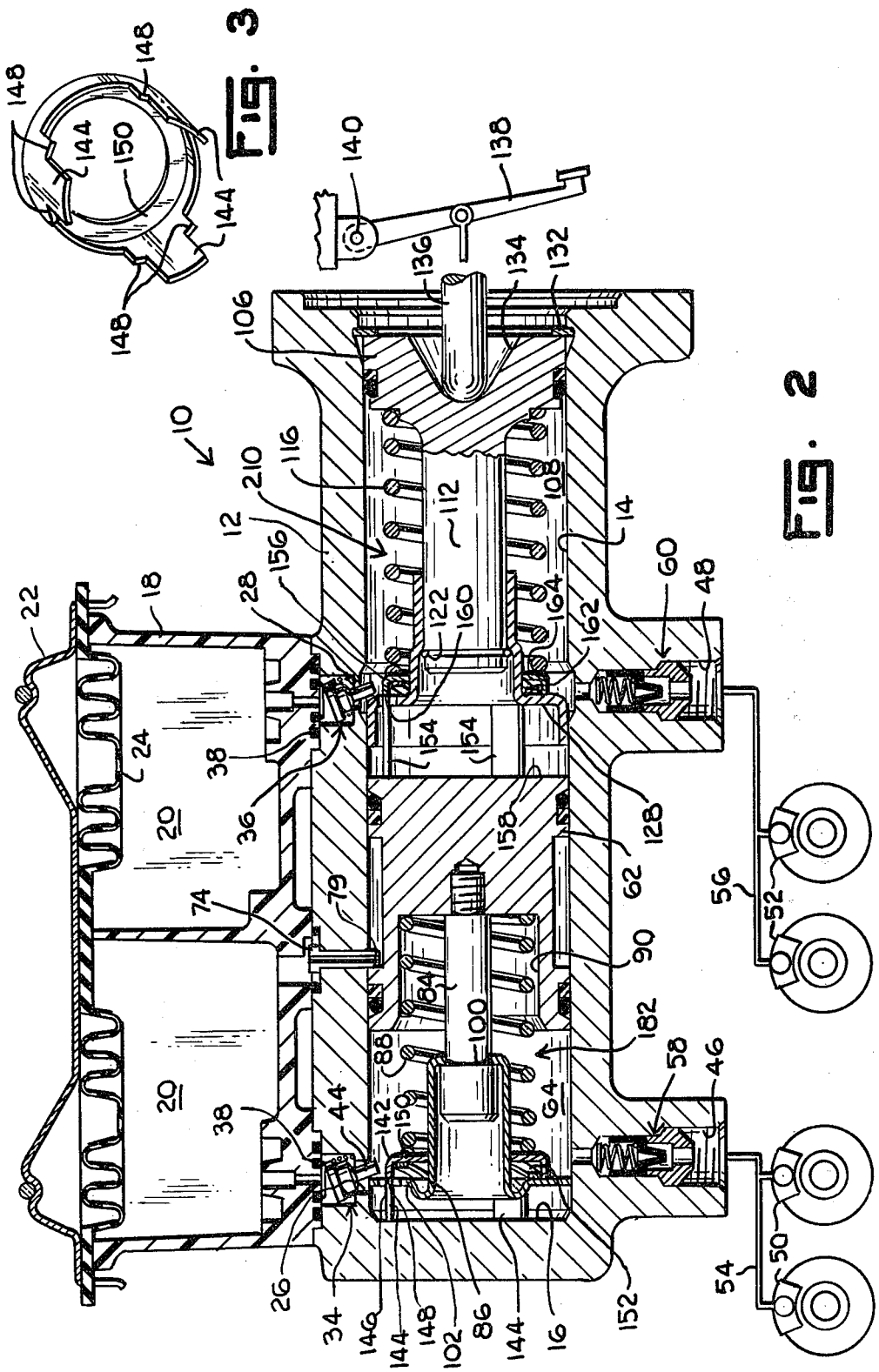

MASTER CYLINDER

This invention relates to a master cylinder. More particularly, this invention relates to a master cylinder for a vehicle having dual hydraulic braking systems. The master cylinder includes a housing defining a bore therein. A pair of inlets communicate liquid from a reservoir into the bore. A pair of valve apparatus control fluid flow through the pair of inlets. A pair of relatively movable pistons are reciprocably received in the housing bore. The pair of pistons cooperate with the housing to define a pair of variable-volume pressure chambers. The pair of pistons are movable within the housing in response to an operator input to close the pair of valve apparatus and to pressurize liquid trapped in the pair of variable-volume pressure chambers. An outlet communicates pressurized liquid from each pressure chamber to an associated brake system.

Accordingly, this invention relates to: A master cylinder comprising a piston reciprocably received in a bore defined by a housing and cooperating with the latter to bound a variable-volume pressure chamber, said housing defining an inlet communicating liquid into said pressure chamber, a valve device disposed in said inlet having a operating stem extending into said bore, tilting of said operating stem moving said valve device between open and closed positions, first resilient means for yieldably biasing said piston to a nonbraking location, said piston being movable to a braking location in response to an operator input force to contract said pressure chamber, and valve actuating means associated with said piston for opening and closing said valve device in response to respective movement of said piston between said nonbraking location and said braking location.

A master cylinder is known wherein the master cylinder housing defines a blind bore having an end wall. A first piston member is reciprocably received in the blind bore and cooperates with the end wall to define a variable-volume pressure chamber. A second piston is reciprocably received in the bore and cooperates with the housing and first piston to define a second variable-volume pressure chamber. A pair of inlets communicate liquid from a reservoir into the pair of pressure chambers. Similarly, a pair of outlets communicate liquid from the pair of pressure chambers to a pair of brake systems. A pair of spring-loaded, self-closing valve apparatus are received in the pair of inlets to control liquid flow through the inlets. Each of the valve apparatus includes an operating stem extending into the housing bore. Each piston carries a valve actuator cooperating with one of the operating stems to hold the associated valve apparatus open when the piston is in a nonbraking position. Each valve actuator includes an axially-extending shaft carried by the associated piston, an actuating collar slidably carrier on the shaft, and an actuator spring biasing the actuating collar to a first position relative to the piston. In the first relative position, each actuator collar engages an operating stem to hold a valve apparatus open when the piston is in a nonbraking position. A first return spring extends between the end wall of the housing and the actuating collar carried by the first piston. The first return spring biases the first piston to a nonbraking position via the associated actuator spring. Similarly, a second return spring extends between the first piston and the actuating collar carried by the second piston. The second return spring biases the second piston to a nonbraking position via the associated actuator spring.

With the master cylinder described above, the second return spring must provide sufficient spring force (a function of spring rate and spring preload, as installed) to overcome the seal friction of the second piston and to overcome the spring load of the associated self-closing valve apparatus in order to move the second piston to a nonbraking position and to open the associated valve. Similarly, the first return spring must provide sufficient force to overcome the seal friction of both pistons, to contract the second return spring (because the second return spring acts on the first piston as well as on the second piston), and to overcome the spring load of both self-closing valve apparatus in order to move the first piston to a nonbraking position and to open the associated valve. Further, in order to insure that the actuating collars follow up the pistons and allow the self-closing valve apparatus to close during a brake application, the actuator springs must both be stronger than the strongest return spring, i.e. the first return spring. Because of the pyramiding of spring forces described above, an operator input force actuating the master cylinder must exceed the preload of the first return spring before pressurized liquid can be supplied to both brake systems. Further, the operator input force must exceed the preload of the strongest actuator spring before a significant volume of pressurized liquid can be delivered to the two brake systems. Additionally, throughout a brake application, the operator input force is resisted by the spring force of the weakest actuator spring. Consequently, a significant part of the operator input force is "wasted" in overcoming spring forces and can not be utilized to pressurize liquid for the brake systems.

A further consideration with a master cylinder as described above is that the pyramiding of spring preloads results in a sequential operation of the self-closing valve apparatus during a brake application. An operator input force first contracts the second return spring to close the valve associated with the second pressure chamber. The operator input force next contracts the first return spring to close the valve associated with the first pressure chamber. As a result of this sequential closing of the valve apparatus, two separate compensation losses occur. That is, the pistons force a finite volume of liquid from both pressure chambers into the reservoir before the valve apparatus close. The finite liquid volume forced into the reservoir is effectively lost and can not be delivered to the brake systems during a brake application.

The invention as claimed is intended to avoid one or more of the shortcomings of prior master cylinders by providing a master cylinder characterized by said valve actuating means including an annular spring seat disposed in said bore and engaging a surface bounding said pressure chamber, said spring seat opposing said first resilient means, a shaft received in said pressure chamber and reciprocable in unison with said piston, a valve actuating collar slidably carried on said shaft and movably received in said annular spring seat, said shaft and said valve actuating collar including coacting abutment means for defining a first relative position thereof, said valve actuating collar in said first relative position engaging said operating stem to open said valve device when said piston is in said nonbraking position, and second resilient means interposed between said spring seat and said actuating collar to urge the latter to move in follow-up relationship in said first relative position with said piston as said piston moves from said nonbraking postion toward said braking position, whereby said operating stem tilts to close said valve device.

The advantages offered by the invention are mainly that the first spring means serves both as a return spring for the one piston means and, during a brake application, as an actuator spring for the associated tilt valve. Thus, pyramiding of spring preloads within a master cylinder having a pair of piston means with tilt valve moving means according to the inventor is substantially avoided. Consequently, an operator input force need only exceed the preload of the first spring means in order to close both tilt valves so that a significant volume of pressurized liquid can be delivered to the brake systems. Because pyramiding of spring preloads is substantially avoided, the preload of the return spring for the other of the pair of piston means need only exceed the preload of the first spring means by an amount sufficient to overcome the seal friction of the first piston means to insure that the tilt valves are closed simultaneously. As a result, only a single compensation loss occurs and a larger volume of liquid is retained in the pressure chambers for delivery to the brake systems.

One preferred way of carrying out the invention is described in detail below with reference to drawing figures which illustrate only this one embodiment, in which:

FIG. 2 is a partial cross-sectional view of a master cylinder according to the invention and illustrating schematically a dual brake system; and FIG. 3 is a perspective view of a spring seat.

Figure 1:
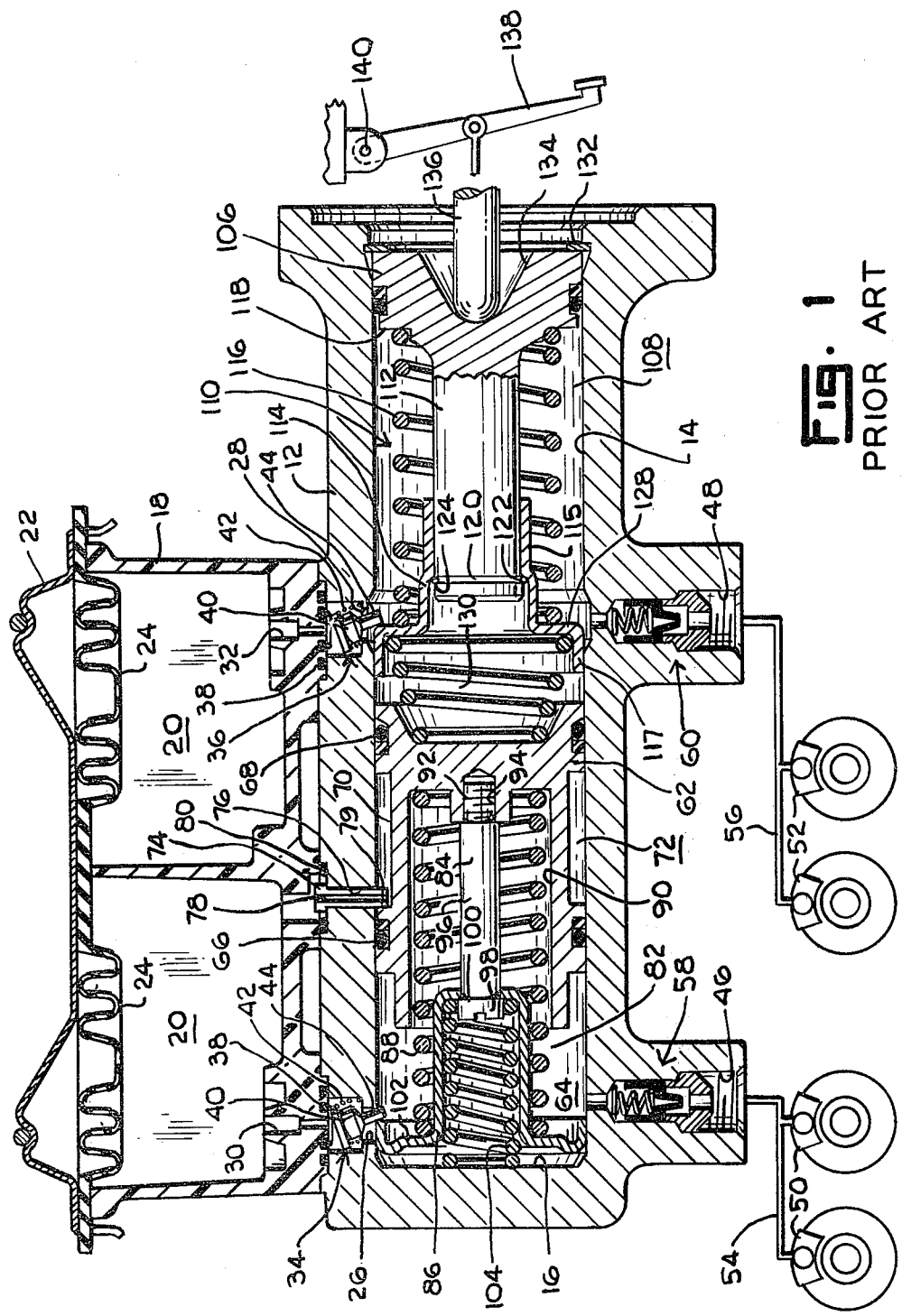
FIG. 1 is a partial cross-sectional view of a known dual master cylinder according to the prior art and illustrating schematically a dual brake system.

FIG. 1 illustrates a master cylinder 10 according to the prior art having a housing 12. The housing 12 defines a bore 14 therein having an end wall 16. A reservoir 18 is secured to the housing 12 by bolts (not shown). The reservoir 18 defines an open cavity 20 for holding a liquid. A cap 22 and a flexible elastomeric diaphragm 24 close the cavity 20. The cap 22 defines an aperture (not shown) admitting atmospheric air to the upper side of diaphragm 24 so that the liquid in cavity 20 is maintained at substantially atmospheric pressure. The housing 12 defines a pair of inlets 26 and 28 communicating liquid from the reservoir 20 into the bore 14 via a pair of passages 30 and 32 defined in the bottom of the reservoir 18.

A pair of spring-loaded, self-closing tilt valves 34 and 36 are received in the inlets 26 and 28, respectively. Each of the tilt valves 34 and 36 includes an annular sealing member 38, a valve member 40, and a coil spring 42. The valve members 40 are sealingly engageable with the inner peripheral portions of the sealing members 38 to close liquid communication from the bore 14 toward the cavity 20. The coil springs 42 bias the valve members 40 toward engagement with the sealing members 38. Each valve member 40 includes an operating stem 44 extending into the bore 14 by which the valve members may be tipped out of sealing engagement with the sealing members 38 (as is illustrated). The outer peripheral portions of the sealing members 38 provide a liquid-tight seal around the inlets 26, 28 and passages 30, 32 at the interface of the housing 12 and reservoir 18.

The housing 12 defines a pair of outlets 46 and 48 communicating liquid from the bore 14 to a pair of brake systems 50 and 52 via conduits 54 and 56, respectively. A pair of pressure retention valves 58 and 60 respectively received in the outlets 46 and 48 control liquid communication between the bore 14 and the brake systems 50 and 52. A first piston 62 is reciprocably received in the bore 14. The piston 62 cooperates with the end wall 16 of housing 12 to define a first variable-volume pressure chamber 64. Inlet 26 and outlet 46 communicate with the chamber 64. The piston 62 carries a pair of annular sealing members 66 and 68 which sealingly cooperate with the housing 12. An annular recess 70 on the piston 62 cooperates with the housing 12 to define an annular chamber 72 between the sealing members 66 and 68. A tubular pin 74 which is slip-fitted into a bore 76 on housing 12 provides venting of the chamber 72 to the cavity 20 via a passage 78. The pin 74 is engageable with a radial wall 79 of recess 70 to define a nonbraking position for the piston 62. An annular sealing member 80 provides a fluid-tight seal around the pin 74 and passage 78 at the interface of the housing 12 and reservoir 18.

A first valve actuator 82 is carried by the first piston 62. The first valve actuator 82 includes a shoulder bolt 84 carried by the piston 62, an annular actuating collar 86 slidably carried on the shoulder bolt 84, and an actuator spring 88 extending between the actuating collar 86 and the floor of a recess 90 on the piston 62. The shoulder bolt 84 includes a small diameter portion 92 threadably engaging a bore 94 on the piston 62, an axially-extending intermediate diameter shaft portion 96, and a large diameter head portion 98. The shaft portion 96 and head portion 98 cooperate to define a shoulder 100 on the bolt 84. The actuating collar 86 is slidably received on the shaft portion 96 of the shoulder bolt 84. The actuator spring 88 biases the actuating collar 86 into engagement with the shoulder 100 to define a first relative position of the collar 86 with respect to the piston 62. A radially outwardly extending annular flange 102 defined by the actuating collar 86 is engageable with the operating stem 44 of the tilt valve 34 to hold the tilt valve open when the piston member 62 is in its nonbraking position, as is illustrated. A first return spring 104 extends between the end wall 16 of housing 12 and the actuating collar 86. The return spring 104 biases the piston 62 toward the nonbraking position via the actuator 82. The springs 88 and 104 oppose one another. However, because the spring rate and/or preload of the spring 88 is greater than that of the spring 104, the actuating collar 86 engages the shoulder 100 when the piston 62 is in its nonbraking position.

A second piston 106 is reciprocably received in the bore 14. The piston 106 cooperates with the first piston 62 and with housing 12 to define a second variable-volume pressure chamber 108. Inlet 28 and outlet 48 communicate with the chamber 108.

A second valve actuator 110 is carried by the second piston 106. The valve actuator 110 includes an axially-extending shaft 112 integral with the piston 106, an actuating collar 114 slidably carried by the shaft 112, and an actuator spring 116 extending between the actuator collar 114 and a shoulder 118 defined on the piston 106. The shaft 112 defines an annular groove 120 receiving a retainer 122 of the wire-ring type. A step 124 on the bore 126 of actuating collar 114 is engageable with the wire ring 122 so that the actuating collar 114 is trapped on the shaft 112. The actuator spring 116 biases the actuating collar 114 into engagement with the wire ring 122 to define a first relative position of the collar 114 with respect to the piston 106. A radially outwardly extending annular flange 128 defined by the actuating collar 114 is engageable with the operating stem 44 of the tilt valve 36 to hold the tilt valve open when the piston 106 is in its nonbraking position, as is illustrated. A second return spring 130 extends between the first piston 62 and the actuating collar 114. The second return spring 130 biases the piston 106 via the actuator 110 into engagement with a snap ring 132 carried by the housing 12 to define the nonbraking position for the piston 106. The springs 130 and 116 oppose one another. However, because the spring rate and/or preload of spring 116 is greater than that of the spring 130, the actuating collar 114 engages the wire ring 122 when the piston 106 is in its nonbraking position. The second return spring 130 also opposes the first return spring 104. That is, the second return spring 130 biases the first piston 62 leftwardly, viewing FIG. 1, away from its nonbraking position. However, the spring rate and/or preload of return spring 104 is greater than that of spring 130 so that the first piston 62 is in its nonbraking position when the piston 106 is in its nonbraking position.

An examination of FIG. 1 comparing the first valve actuator 82 with the second valve actuator 110 will reveal that the two valve actuators are substantially the same in structural and functional cooperation vis-a-vis the associated tilt valves. The structural distinctions extant between the two valve actuators stem from the differing lengths of the two pistons 62 and 106. For example, because the piston 106 is relatively short, it is subject to tipping in the bore 14. Consequently, the actuating collar 114 defines a guide sleeve 115 slidably receiving the shaft 112. Further, the flange 128 of the actuator collar 114 defines an axially extending guide ring 117 which slidably engages the housing 12. As a result, the valve actuator 110 prevents the piston 106 from tipping in the bore 14.

The second piston 106 defines a recess 134. A push rod 136 is pivotally received at one end in the recess 134 and is pivotally connected at the other end to a brake pedal 138. The brake pedal 136 is pivoted at 140 so that an operator input force may be applied to the piston 106.

As was noted above, when an operator input force is applied to the piston 106, the tilt valve 36 is closed. Liquid trapped in the chamber 108 in combination with contraction of the spring 130 tranfers the input force to the piston 62. Leftward movement of the piston 62 closes the tilt valve 34. It follows that two compensation losses occur, one from each pressure chamber, because of the sequential operation of the tilt valves 34 and 36.

FIG. 2 illustrates a master cylinder 10 embodying the present invention. The master cylinder illustrated in FIG. 2 is substantially the same as the master cylinder illustrated by FIG. 1 with the exception of features to be hereinafter pointed out. Therefore, the same reference numerals are used throughout to indicate features which are analogous in structure or function. Upon inspection of FIG. 2, it will be noted that the first piston 62 and second piston 106 carry valve actuators 182 and 210, respectively.

The valve actuator 182 includes an actuator collar 86 which is slidably carried on a shoulder bolt 84 carried by the piston 62. The actuating collar 86 is engageable with the operating stem 44 of the tilt valve 34 to hold the tilt valve open when the piston 62 is in its nonbraking position, as is illustrated. An annular spring seat 142 is slidably carried on the actuating collar 86. The spring seat 142 includes three legs 144 (only two of which are visible in FIG. 2) which extend axially through respective apertures 146 defined in the actuating collar 86 to engage the end wall 16 of the housing 12. A first actuator spring 88 extends between the spring seat 142 and the floor of a recess 90 on the piston 62. The actuator spring 88 biases the piston 62 to its nonbraking position and biases the spring seat 142 into engagement at its three legs 144 with the end wall 16. As a result, the three legs 144 define a tripod support opposing the actuator spring 88. Each of the three legs 144 of the spring seat 142 defines a pair of shoulders 148, viewing FIG. 3, which are engageable with the radially extending flange 102 of the actuating collar 86 to space a radially extending flange 150 on the spring seat 142 from the flange 102. A first annular wave spring 152 is interposed between the flanges 102 and 150 of the actuating collar 86 and spring seat 142, respectively. The wave spring 152 biases the actuating collar 86 leftwardly into engagement with a shoulder 100 on the shoulder bolt 84 to define a first relative position for the actuating collar 86 with respect to the piston 62. In the nonbraking position of the piston 62, the actuator spring 88 contracts the wave spring 152 via the shoulder bolt 84 and actuating collar 86 to engage the shoulders 148 of legs 144 with the flange 102 and to move the flange 102 to a position holding the tilt valve 34 open, as is illustrated.

The valve actuator 210 carried by piston 106 is substantially similar to the valve actuator 182 while incorporating those structural distinctions extant between the valve actuators 82 and 110. Of course, the three legs 154 of the annular spring seat 156 in valve actuator 210 engage a surface 158 on the first piston 62 to oppose the actuator spring 116. Shoulders 160 on the legs 154 engage the flange 128 of actuating collar 114 to move the collar 114 into engagement with a wire ring 122 on shaft 112 and contract a wave spring 162 between the flange 128 and a flange 164 on the spring seat 156. The wave spring 162 in the valve actuator 210 is substantially the same as the wave spring 152.

In a preferred embodiment of the master cylinder illustrated by FIG. 2, the actuator springs 88 and 116 have preloads of approximately 16.4 Kg. (36 pounds) and 27.3 Kg. (60 pounds), respectively. The two wave springs 152 and 162 have preloads of approximately 2.7 Kg. (6 pounds) when the shoulders 148 and 160 on legs 142 and 154 are engaged with the associated actuating collar flanges 102 and 128, respectively.

When an operator input force is applied to piston 106 of the master cylinder illustrated by FIG. 2 via push rod 136 to effect a brake application, the input force need only exceed the preload of actuator spring 88 (16.4 Kg.; 36 pounds) in order to move both pistons 62 and 106 simultaneously leftwardly in the bore 14 to simultaneously close both of the tilt valves 34 and 36. Because the pistons 62 and 106 move leftwardly simultaneously only one compensating loss occurs. The one compensating loss occurs with respect to chamber 64. The operator input force is transferred from piston 106 to piston 62 via actuator spring 116, spring seat 156, and legs 154. The 27.3 Kg. (60 pounds) preload of the spring 116 insures that the pistons 62 and 106 move leftward simultaneously. As the pistons 62 and 106 together move leftwardly, the wave springs 152 and 162 provide a leftwardly directed force to the actuating collars 86 and 114. The force provided by the wave springs 152 and 162 to collars 86 and 114 is substantially centered at the axis of bore 14 so that the collars 86 and 114 move in follow-up relationship with the pistons 62 and 106, to close the tilt valves 34 and 36 without wedging in the bore 14. Of course, the operator input force must exceed the preload of spring 116 (27.3 Kg.; 60 pounds) before a significant volume of pressurized liquid can be supplied to both brake systems.

In the event that the piston 62 becomes stuck in the bore 14 so that it can not be moved leftwardly during a brake application by a force of 27.3 Kg. (60 pounds) via the spring 116, the operator input force contracts the spring 116 so that the piston 106 moves leftwardly in the bore 14 relative to the piston 62. The wave spring 162 provides a leftwardly directed force to the actuator collar 114 insuring that the collar moves in follow-up relationship with the piston 106 to close the tilt valve 36 without wedging in the bore 14. Pressurized liquid in the pressure chamber 108 in combination with contraction of the spring 116 moves the piston 62 leftwardly to close the tilt valve 34 and pressurize liquid in the chamber 64. Of course, two compensating losses occur in this case because the pistons 62 and 106 do not simultaneously move leftwardly from their nonbraking positions.

I claim:

1. A master cylinder comprising a piston reciprocably received in a bore defined by a housing and cooperating with the latter to bound a variable-volume pressure chamber, said housing defining an inlet communicating liquid into said pressure chamber, a valve device disposed in said inlet having an operating stem extending into said bore, tilting of said operating stem moving said valve device between open and closed positions, first resilient means for yieldably biasing said piston to a nonbraking location, said piston being movable to a braking location in response to an operator input force to contract said pressure chamber, and valve actuating means associated with said piston for opening and closing said valve device in response to respective movement of said piston between said nonbraking location and said braking location, characterized by said valve actuating means including an annular spring seat disposed in said bore and engaging a surface bounding said pressure chamber, said spring seat opposing said first resilient means, a shaft received in said pressure chamber and reciprocable in unison with said piston, a valve actuating collar slidably carried on said shaft and movably received in said annular spring seat, said shaft and said valve actuating collar including coacting abutment means for defining a first relative position thereof, said valve actuating collar in said first relative position engaging said operating stem to open said valve device when said piston is in said nonbraking position, second resilient means interposed between said spring seat and said actuating collar to urge the latter to move in follow-up relationship in said first relative position with said piston as said piston moves from said nonbraking position toward said braking position, whereby said operating stem tilts to close said valve device, and said valve actuating collar defines an aperture therein, said annular spring seat including an axially extending leg movably extending through said aperture to engage said surface.

2. The invention of claim 1 wherein said coacting abutment means includes a shoulder defined by said axially extending leg, said shoulder engaging said valve actuating collar at a point of contact which is adjacent to said aperture.

3. The invention of claim 1 or 2 wherein said second resilient means includes an annular wave spring.

4. The invention of claim 3 wherein said valve actuating collar includes a guide sleeve slidably engaging said shaft and a guide ring slidably engaging said housing, said valve actuating collar cooperating with said shaft to restrain tipping of said piston within said bore.

5. The invention of claim 1 wherein said spring seat defines at least three axially extending legs extending through respective apertures defined by said valve actuating collar to engage said surface, said at least three legs cooperating to define a tripod support opposing said first resilient means.

6. A dual master cylinder comprising a housing defining a bore therein having an end wall, a reservoir for holding a liquid, said housing defining a pair of inlets communicating liquid from said reservoir into said bore and a pair of outlets communicating liquid from said bore to a pair of fluid pressure responsive brakes, a pair of self-closing tilt valves received in said inlets, said tilt valves in an open position opening liquid communication through said inlets and in a closed position closing liquid communication from said bore toward said reservoir while allowing liquid communication in the opposite direction in response to a predetermined pressure differential thereacross, each of said pair of tilt valves including an operating stem extending into said bore for moving the associated tilt valve between its open and closed positions, a pair of relatively movable piston means reciprocably received in said bore for cooperating with said housing to bound a pair of variable-volume pressure chambers, each of said pair of variable-volume pressure chambers communicating with one of said pair of inlets and with one of said pair of outlets, means for defining a nonbraking location for each of said pair of piston means, means for moving said pair of piston means to braking locations decreasing the volume of said pair of variable-volume pressure chambers, and means for moving said tilt valves between said open and closed positions via said operating stems in response to respective movement of said pair of piston means between said nonbraking and braking locations, characterized in that said tilt valve moving means includes an axially extending shaft carried by one of said pair of piston means, an annular actuating collar slidably carried on said shaft, said actuating collar in a first relative position engaging the operating stem of one of said pair of tilt valves to move said one tilt valve to said open position when said one piston means is in said nonbraking location, an annular spring seat slidably carried on said actuating collar, first spring means extending between said spring seat and said one piston means for biasing said one piston means to said nonbraking location said spring seat including a multitude of axially extending legs movably extending through apertures defined by said actuating collar, said legs engaging a surface bounding the one of said pair of pressure chambers which is bounded by said one piston means to oppose said first spring means, and second spring means interposing between said actuating collar and said spring seat for urging said actuating collar to move in follow-up relationship in said first relative position with said one piston means to disengage from the operating stem of said tilt valve when said one piston means moves from said nonbraking location to said braking location.

7. The invention of claim 6 wherein said tilt valve moving means further includes a second axially extending shaft carried by the other of said pair of piston means, a second actuating collar slidably carried on said second shaft, said second actuating collar in a first relative position engaging the operating stem of the other of said pair of tilt valves to move said other tilt valve to said open position when said other piston means is in said nonbraking location, a second annular spring seat slidably carried on said second actuating collar, third spring means extending between said second spring seat and said other piston means for biasing said other piston means to said nonbraking position, said second spring seat including a multitude of axially extending legs movably extending through apertures defined by said second actuating collar, said legs engaging a surface bounding the other of said pair of variable volume pressure chambers to oppose said third spring means, and fourth spring means interposing between said second actuating collar and said second spring seat for urging said second actuating collar to move in follow-up relationship in said first relative position with said other piston means to disengage from the operating stem of said other tilt valve when said other piston means moves from said nonbraking location to said braking location.

8. The invention of claim 6 wherein said surface is defined by said bore end wall.

9. The invention of claim 6 wherein said surface is defined by the other of said pair of piston means.

10. The invention of claim 6, 8 or 9 wherein said second spring means includes an annular wave spring received between said actuating collar and said spring seat.

11. The invention of claim 7 wherein said second and said fourth spring means each includes an annular wave spring.

12. The invention of claim 6 wherein said multitude of axially extending legs are three in number and cooperate to define a tripod support opposing said first spring means.

13. The invention of claim 7 wherein said multitude of axially extending legs opposing said third spring means are three in number and cooperate to define a tripod support opposing said third spring means.

* * * * *